(12) United States Patent
Umblijs et al.

(10) Patent No.: US 8,401,944 B2
(45) Date of Patent: Mar. 19, 2013

(54) MARKETING INVESTMENT OPTIMIZER WITH DYNAMIC HIERARCHIES

(75) Inventors: Andris Umblijs, Woking (GB);
Janmesh Dev Srivastava, London (GB);
Rahul Mahajan, Vikaspur (IN);
Prarthna Agarwal Goel, Dwarka (IN);
Varun Rastogi, Rohini (IN); Chao Wang, London (GB)

(73) Assignee: Accenture Global Services Limited, Dublin (IE)

( * ) Notice: Subject to any disclaimer, the term of this patent is extended or adjusted under 35 U.S.C. 154(b) by 334 days.

(21) Appl. No.: 12/749,756

(22) Filed: Mar. 30, 2010

(65) Prior Publication Data
US 2011/0166980 A1 Jul. 7, 2011

(30) Foreign Application Priority Data
Jan. 6, 2010 (IN) .............................. 34/CHE/2010

(51) Int. Cl.
*G06Q 40/00* (2006.01)
(52) U.S. Cl. ........................................................ 705/35
(58) Field of Classification Search ...................... 705/35
See application file for complete search history.

(56) References Cited

U.S. PATENT DOCUMENTS 7,818,682 B2 * 10/2010 Brand et al. .................. 715/763
2003/0177139 A1   9/2003 Cameron et al.
2005/0038768 A1   2/2005 Morris
2008/0294596 A1  11/2008 Xiong
2010/0017286 A1 * 1/2010 Coles et al. ................ 705/14.43

FOREIGN PATENT DOCUMENTS

EP  1308852 A1  5/2003
WO 03032125 A2  4/2003

OTHER PUBLICATIONS

Jiawei Han et al., "Data Mining Concepts and Techniques", Jan. 1, 2001, pp. 5-15, 23, 45.

\* cited by examiner

*Primary Examiner* — James Vezeris
(74) *Attorney, Agent, or Firm* — Mannava & Kang, P.C.

(57) ABSTRACT

A hierarchal view preserving relationships between data is generated by storing information related to sales and investment. The information includes dimensions and each of the dimensions includes a level and each of the levels is described by variables. Relationships between the variables are also stored. A request for a hierarchy is received. The requested hierarchy includes a set of dimensions from the stored dimensions, a level for each dimension in the set, and a sequence of the dimensions or levels in the hierarchy. A computer system calculates values for the variables in the levels for the requested hierarchy using the stored relationships that are applicable to the variables in the levels. A view of the hierarchy is generated and includes the calculated values. The view also includes the dimensions or levels of the requested hierarchy in the sequence specified for the requested hierarchy.

15 Claims, 10 Drawing Sheets

MARKETING INVESTMENT OPTIMIZER WITH DYNAMIC HIERARCHIES

BACKGROUND

It is critical for most companies to engage in marketing activities to maintain and improve market share. Many large companies spend millions of dollars on marketing. However, despite the amount of money spent on large marketing campaigns, often significantly less resources are spent optimizing marketing campaigns to maximize effectiveness for achieving business objectives.

Some typical efforts for analyzing marketing campaigns include generating reports that indicate sales volume for the products being marketed. However, the generation of rudimentary reports only gives a very basic understanding of how effective a marketing campaign is in improving sales. Furthermore, these reports may not be very beneficial for different users to optimize a marketing campaign and may not be the most accurate gauge of a marketing campaign's effectiveness.

For example, typically, many different users have different roles within a company's marketing division, and depending on their roles, they may need to view marketing data differently. An executive responsible for the entire Asian division would like to see all sales data for all products being sold in Asia. However, a sales manager responsible for a particular product in a particular city would only like to see sales data for that product in that city. In a typical scenario, different static reports providing the needed sales volumes would be created for the executive and the sales manager, and the reports would be run in batch jobs nightly or weekly and made available to the executive and the sales manager.

These reports do not provide any ability for the user to view data differently, and do not allow the user to run simulations to determine how to optimize their marketing efforts and investments. For example, the executive may want to break the sales data down by product line. A new report would have to be generated and then run to get the requested data. Later, the executive may want to view the data broken down by city. Again, a new report would need to be generated and then run. Each time a report needs to be generated, it would require a user to communicate with an information technology (IT) or database manager to create the report. Also, the IT person would need to determine whether the user has data access rights to the data for the report, and finally, the report would need to be run or scheduled to run at a later time. Thus, many tasks need to be performed to create and run reports, which is inefficient. Furthermore, the report has no ability to run if-then simulations that would allow the user to vary marketing investments to determine if it would positively impact sales.

Additionally, the static reports typically created through periodic batch jobs may not capture and preserve different relationships between data. For example, the sales manager may be given a budget for marketing multiple products in the city. One of the sales manager's duties is to allocate funds for different marketing activities. The sales manager may identify from the report that there is a reduction in sales volume for a certain product and may then decide to allocate a majority of the budget for marketing that product. However, the sales manager is unaware and the report is unable to identify that there is synergistic relationship between different marketing activities that does not require spending a majority of the budget to improve sales. Without knowing these relationships, it is very difficult to effectively allocate funds for certain marketing activities to improve sales.

BRIEF DESCRIPTION OF DRAWINGS

The embodiments of the invention will be described in detail in the following description with reference to the following figures.

FIG. 5 illustrates an example of screen shot that shows a view of the hierarchy, including the variables simulated by a simulator, according to an embodiment;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. System

Figure 1:
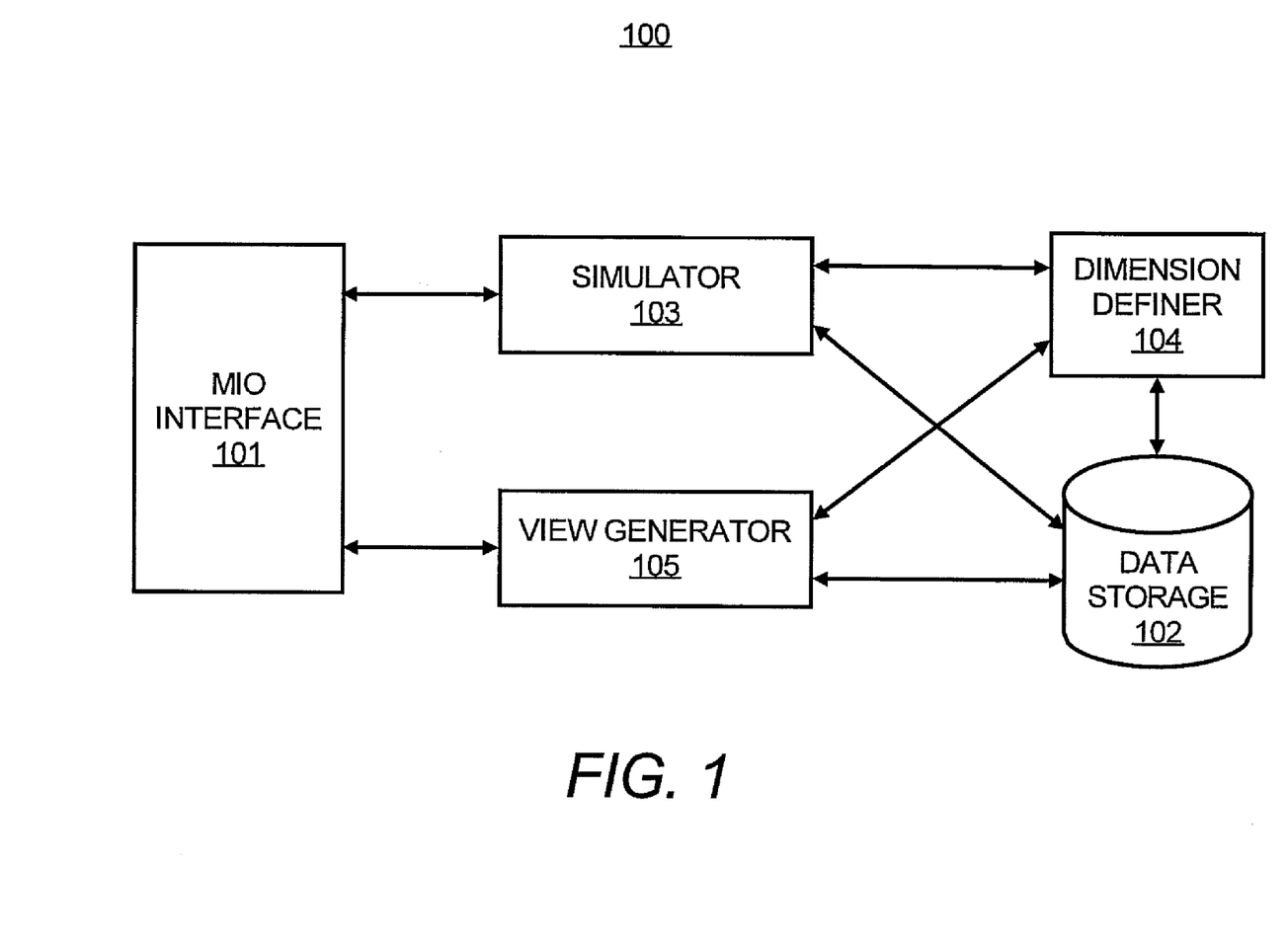
FIG. 1 illustrates a system, according to an embodiment.

FIG. 1 illustrates a marketing investment optimizer (MIO) system 100, according to an embodiment. The MIO system 100 includes a MIO interface 101, a data storage 102, a simulator 103, a relationship definer 104, and a view generator 105. The data storage 102 includes a data storage device that stores data organized in a manner that allows desired data to be easily retrieved. For example, the data storage 102 may include a relational database, or be part of an online analytical processing (OLAP) system for retrieving data, or include another type of platform providing similar functionality.

The data storage 102 stores marketing investment information and hierarchies of the marketing investment information. The hierarchies include dimensions, levels for the dimension, and variables for each dimension. One example of a dimension is geography. Levels of the dimension may include country, state, city, zip code, street, etc. Another example of a dimension is a product category, and the levels may be different products lines and different products within each product line. Another example of a dimension is a type of marketing activity, and the levels may include different channels, such as TV, Internet, radio, direct, etc. A hierarchy may be comprised of different dimensions and levels in a specified sequence. Also, each dimension and level is characterized by variables describing marketing information for the dimension. Examples of variables may include amount spent for different marketing activities, sales volume, marketing driven incremental sales uplift, return-on-investment (ROI), etc.

The dimensions are related to each other such that a change to one dimension may cause a change to another dimension. For example, if a first variable in one dimension is modified, a second variable in another dimension is changed according to the relationship it has with the first variable. The relationship definer 104 determines the relationships between variables. The relationships may include functions that describe the relationships between variables. A function describing a relationship may be a mathematical expression that describes any relationship between two variables. For example, a function may describe a curve that illustrates a nonlinear relationship between variables. In another example, a function may be a ratio that describes a linear relationship between variables.

The relationships determined by the relationship definer 104 may describe relationships between variables in different dimensions or variables in the same dimension. The variables may be in the same level or in different levels in a dimension.

The MIO interface 101 may be a user interface, such as a graphical user interface (GUI), that allows users to view certain dimensions and levels in a desired sequence. For example, one user may desire to view all the marketing activities for a particular product line for a particular region. That user may select a hierarchy comprised of three dimensions in the order of the product dimension, the geography dimension, and the marketing activity dimension. The user also selects levels for each dimension. The user may select a level of the product dimension for product line A, and select the northeast as a level for the geography dimension. The user may select all levels for the marketing activities dimension. This hierarchy is selected via the MIO interface 101.

The view generator 105 receives the selections from the user and generates a view of the requested hierarchy. For example, the view generator 105 identifies the variables for the different levels from the data storage 102. The view generator 105 also determines the values for the variables. For example, the view generator 105 determines the investment for each marketing activity for the product line A in each state. The values may also be stored in the data storage 102, and the view generator retrieves the investment for each marketing activity for the product line A in each state from the data storage 102. Some of the values may need to be calculated. For example, if the data storage 102 stores the total marketing activity investment for each state, view generator 105 sums all the marketing activity investments for the states in the northeast to determine a total marketing activity investment value for the northeast.

The view generator 105 also determines whether there is any relationships between the variables. For example, the view generator 105 passes a list of the variables for the levels of the hierarchy to the relationship definer 104 and an indication of the structure of the hierarchy. The relationship definer 104 uses the list of variables to identify whether any relationships exist between the variables. The relationship definer 104 may determine whether any functions describing the relationships are stored in the data storage 102. The functions for any identified relationships are used to calculate values for the variables that are related. The functions may be sent or identified to the view generator 105, and the view generator 105 calculates the values for the variables using the functions. Calculations may include determining an uplift if a relationship defines an uplift for two variables. An uplift may be an estimation of sales volume for each dollar of investment in a marketing activity. Another calculation may be an aggregation, such as aggregating sales volumes for each state in a region or country.

The view generator 105 generates a view of the hierarchy including the variables, some of which may be calculated based on their relationships with other variables. The view of the hierarchy may be displayed to the user via the MIO interface 101.

The MIO interface 101 allows the user to select different dimensions and levels and sequences to view different hierarchies. This is a stark departure from conventional static reports, which cannot be manipulated. Using the MIO interface 101, different users may view different hierarchies so the marketing investment information and corresponding sales uplift is presented to the user in manner most desirable and efficient for the particular user to extract the necessary information for decision-making. Also, when a user selects dimensions and levels for a hierarchy, the view generator 105 may determine whether the user has data access rights to view the dimensions and levels. The user may only be able to select dimensions and levels for which the user is authorized to access.

The simulator 103 estimates values for variables in dimensions and levels. For example, through the MIO interface 101, the user may view the hierarchy described above comprised of product line A, all marketing activities and northeast states of the US. One objective of the user may be to increase the ROI for the product line A. The user provides inputs identifying modifications to values for different marketing activities. For example, the user may change the amount spent for online marketing or other types of marketing. The simulator 103 estimates the ROI given the new amount spent for online marketing. The MIO interface 101 allows the user to view the hierarchy and input changes to different variables that are displayed in the hierarchy. These inputs are provided to the simulator 103 along with the hierarchy to determine new values for certain variables in the hierarchy that are affected by the inputs.

The variables in the levels of the hierarchy may be categorized as input and output variables. The input variables are variables that may be changed by the user for simulation. The output variables are variables that are determined by running the simulation. The input variables may include any variable that impacts sales, such as amount spent for different marketing activities, independent economic factors, etc. The input variables may also include constraints, which may be modified for simulation. The output variables may include any variable that is affected by the input variables, such as sales volumes, revenue, profits, or other ROI variables.

When the simulator 103 makes its estimations it preserves the relationships between variables. For example, the simulator 103 communicates with the relationship definer 104 to determine whether any relationships exist between certain variables to calculate values for those variables. The functions for those variables are used to calculate the variables.

The simulator 103 may use models determined through regression analysis and historic data analysis to estimate values for output variables based on the models. The models may include probability distributions of different output variables based on values for input variables. The regression analysis may include conventional techniques for modeling and analyzing several variables. For example, linear regression or ordinary least squares regression may be used to determine the function describing the relationship between two variables.

The simulator 103 and the view generator 105 may also perform curve fitting to determine curves and for the requisite level. Curve fitting is the process of constructing a curve, or mathematical function, that is a best fit to a series of data points, possibly subject to constraints.

In addition to the simulator 103 running simulations, such as various what-if scenarios whereby a user changes one or more marketing investments to see how it impacts returns, the simulator 103 is also configured to determine the most optimal marketing investments to achieve the greatest returns. For example, the simulator 103 uses the models to estimate that certain investment amounts in certain marketing activities will maximize sales volume, profits, etc. This is one form of optimization that can be performed by the simulator 103. This optimization may be run based on constraints provided by the user.

2. Examples of Relationships and Constraints Preserved by the System

As described above the relationship definer 104, view generator 105, and the simulator 103 preserve relationships between different variables for simulating and displaying hierarchies. These relationships may include linear and nonlinear relationships between variables as well as other types of relationships. One example of another type of relationship includes corporate spend. Corporate spend is an investment made at a higher level of a hierarchy that can span across lower levels. For example, a company may provide many different services or sell many different types of products, but the company may invest money for marketing the company brand rather than any particular service or product. This may impact sales of various products and services differently. This impact of corporate spend at different levels of different dimensions is determined and saved as relationships. For example, a relationship between corporate spend and sales volume for each product is stored in the data storage 102. These relationships may be identified by the rule definer 104 if applicable to a particular hierarchy, and used to calculate values for the variables in the hierarchy.

A relationship may also describe a rule for determining a value for a variable in a lower level or a higher level based on the organization or structure of the hierarchy. For example, if a country is in a higher dimension than a product in a hierarchy, the country's total investment for marketing activities for the product equals the sum of all investments for all marketing activities for that country (e.g., amount spent in dollars for all marketing activities for that country). If a user changes the product to be a higher dimension, then the product total investment should equal sum of all marketing investments for that product across all countries. Another rule may be for simulation. For example, if investments are changed at the higher dimension, the investments are allocated at the leaf level in the historical spend proportion. If the investment is changed at the leaf level, spends are aggregated up to the highest dimension in the hierarchy. Further, if the user changes the investment at any dimension, the variables indicating the investment are re-calculated to maintain the spend proportions and inherent structure.

Other types of relationships that are maintained and applied by the system 100 include relationships associated with a halo effect, a cannibalization effect, and a synergy effect. The halo effect is when actions for one product positively impact another product, such as improving sales for the second product. For example, advertising for one product may positively impact sales of another product that is related or used in conjunction with the advertised product. The cannibalization effect is when there is a negative impact. For example, if a company sells two types of detergent. A price drop for one type of detergent may cause a reduction in sales for the other detergent. The synergy effect is for marketing activities rather than products. The synergy effect is a combined or complementary effect of simultaneous marketing activities. For example, if amount spent for two different marketing activities was increased by 2% for each activity, the synergy effect causes the sales of the product to improve by 10% rather than 4%. The relationships identified for these effects are determined and may be stored as functions or curves for use by the relationship definer 104 and the simulator 103.

A relationship between variables may be described by a response curve. For example, a response curve may be generated that indicates sales volume per marketing investment (i.e., uplift) for a particular city. Multiple response curves may be generated for multiple cities in a state. The response curves may be stored in the relationship definer 104 as functions. If a user desires to view the sales volume per marketing investment for the entire state, then the relationship definer 104 aggregates the curves for each of the cities into a single curve for the entire state. This aggregated curve may be used to generate a view or for simulation. The curves may be aggregated on a common variable. For example, if all the curves have sales volume in terms of dollars as an axis, the curves are aggregated along that axis.

The system 100, in addition to preserving relationships between variables, also allows users to apply constraints at different levels of a hierarchy. The constraints may be received via the MIO interface 101 and stored in the data storage 102. The view generator 105 or the simulator 103 may enforce the constraints. A constraint may be a minimum and/or a maximum for a variable. For example, there may be constraints on the minimum or maximum amount of investment for particular marketing activities. These constraints are stored in the data storage 102.

In one example, if a user tries to modify a variable for simulation such that a constraint is violated, a message is generated to the user that the variable cannot be modified to the particular value because it would cause a constraint to be violated. The constraint may be displayed to the user via the MIO interface 101, and the user may be prevented from entering the value for simulation. In another example, for simulation, the user is allowed to modify constraints to see how the modifications impact the output variables. The simulator 103 is also configured to determine the most optimal marketing investments to achieve the greatest returns. For example, the simulator 103 uses the models to estimate that certain investment amounts in certain marketing activities will maximize sales volume, profits, etc. This optimization may be run so all constraints are satisfied.

Constraints are also resolved. There may be some conflict between a constraint at a higher level and one at a lower level. For example, a higher dimension or level has a constraint range of 50%-120% and a lower dimension or level has a constraint range of 80%-150%. The overlap, e.g., 80%-120%, is selected as the constraint range and enforces that range. If there is no overlap, then a message may be generated that this hierarchy generates an "infeasible solution" and requests changing the constraints or hierarchy.

3. Screen Shot Examples

Figure 2:
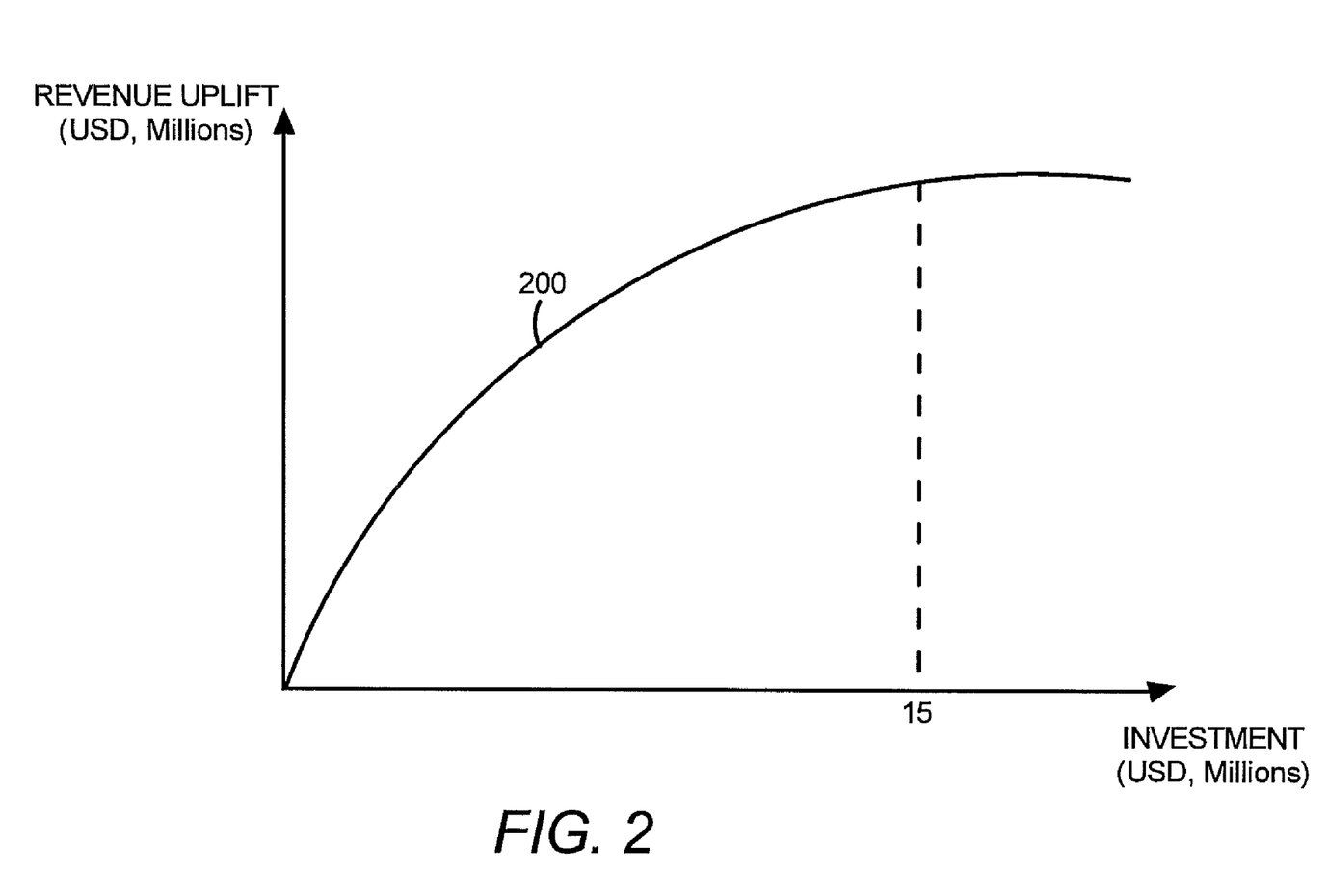
FIG. 2 illustrates an example of a response curve for investment on the x-axis and revenue/returns on the y-axis, according to an embodiment.

FIG. 2 shows an example of a response curve 200 for two variables revenue uplift, which is the y-axis, and investment, which is the x-axis. The revenue uplift is the incremental increase in revenue given a certain amount of investment. After a certain amount of investment is made, e.g., 15 million, then there is diminished return because the revenue uplift starts to flatten at that point. The curve 200 may be represented and stored as a function and used for simulation by the simulator 103 to estimate the revenue uplift for different investments. The function may also be used to determine the optimal investment to maximize returns.

Figure 3:
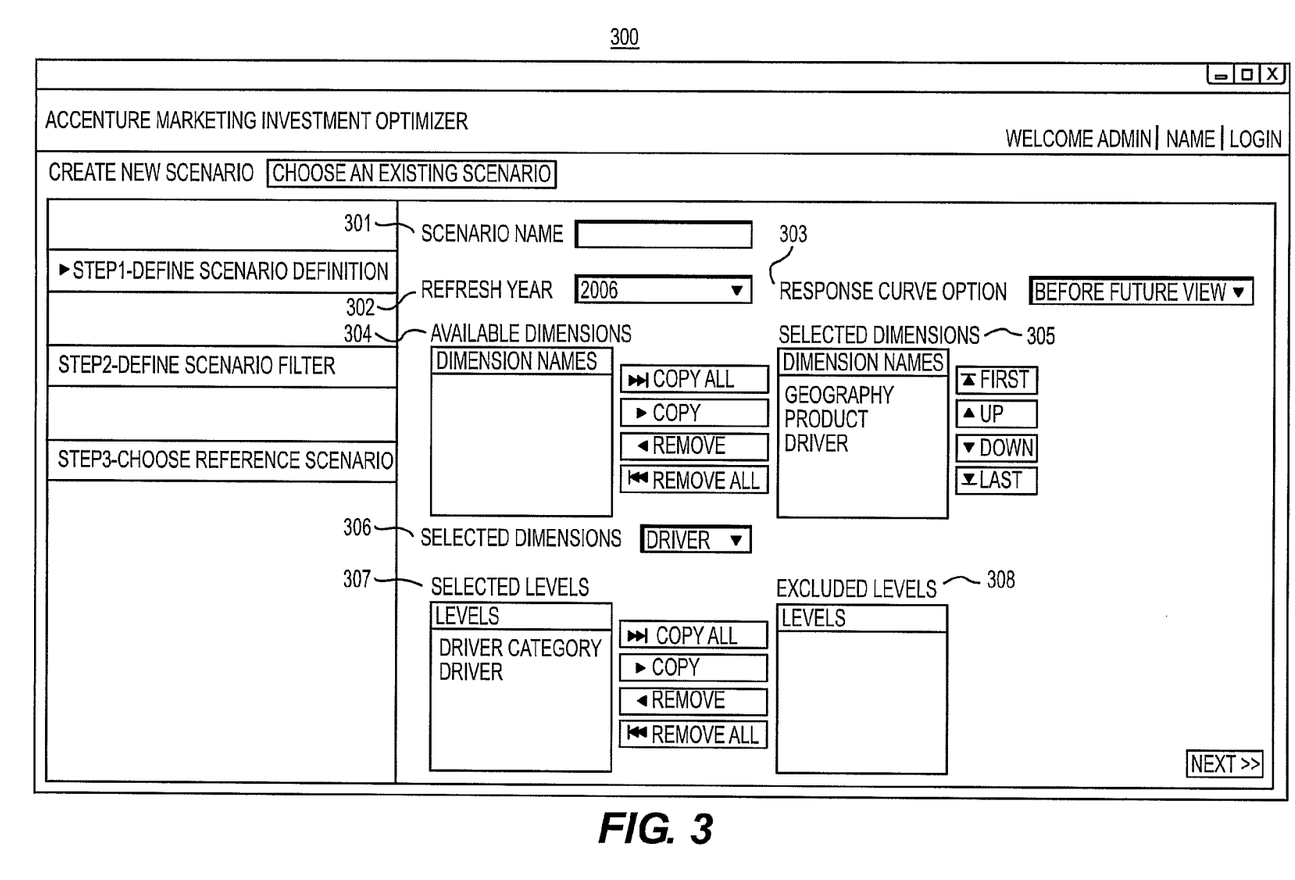
FIG. 3 illustrates an example of a screen shot that may be generated through an interface that allows users to select desired dimensions and levels for a hierarchy, according to an embodiment.
Figure 4A:
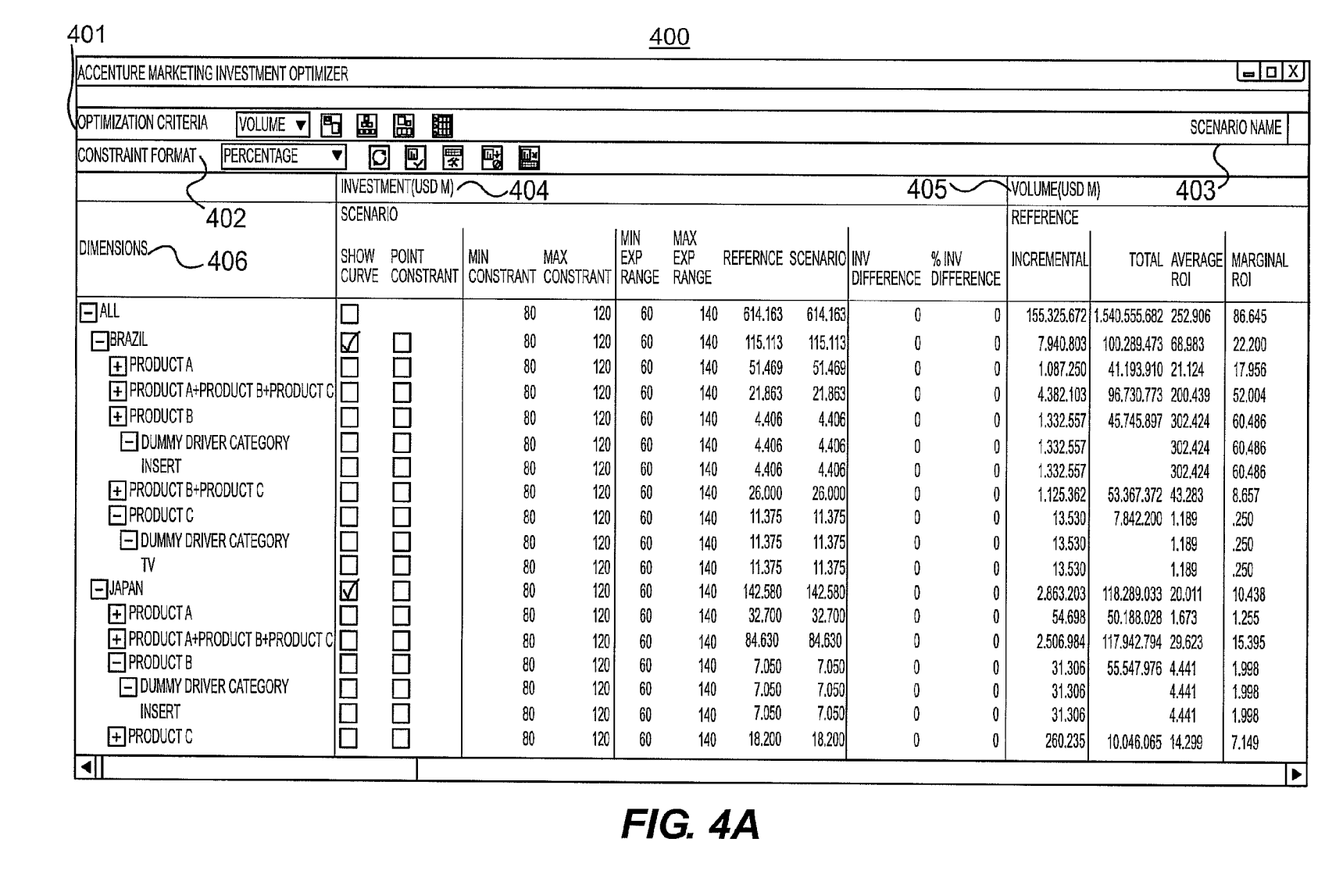
FIGS. 4A-B illustrate examples of screen shots that show views of a hierarchy, according to an embodiment.
Figure 4B:
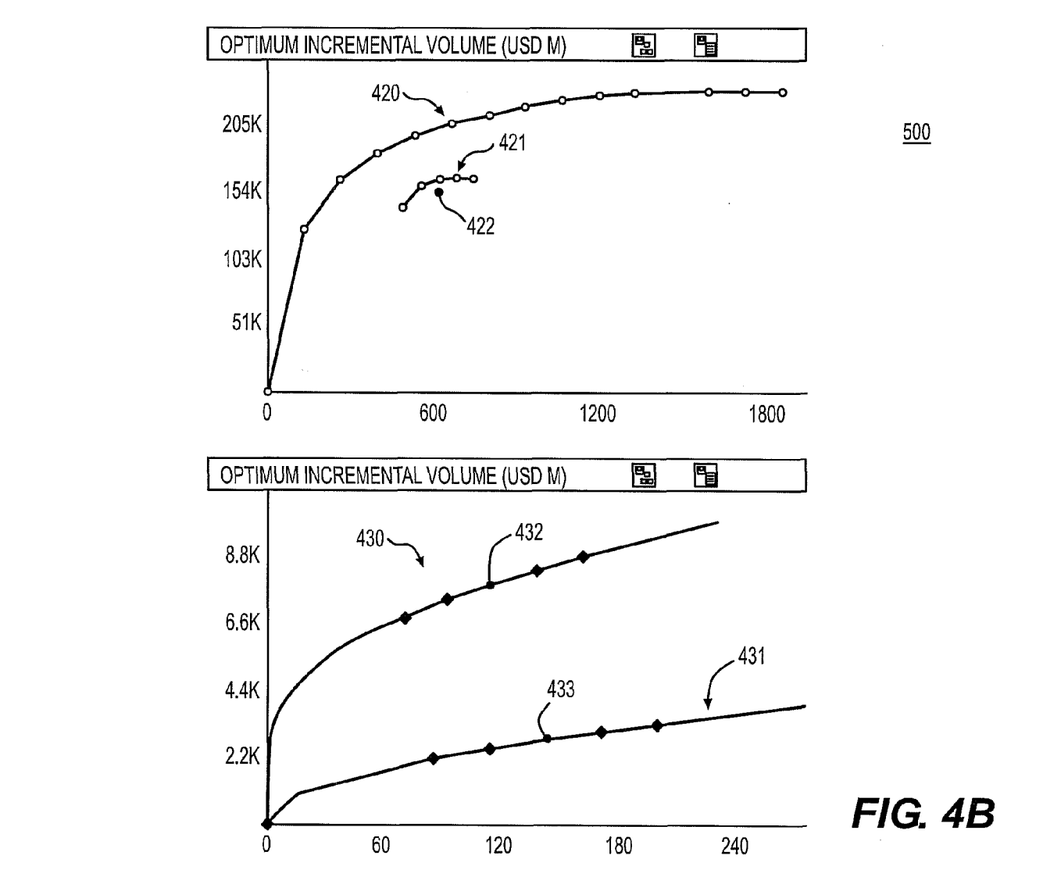

FIGS. 3-5 illustrate examples of screens that may be generated through the MIO interface 101. FIG. 3 shows a screen 300 that allows users to select desired dimensions and levels for a hierarchy to view. The user can assign a name to the hierarchy by inputting a name in the box for scenario name, labeled 301. The user may also select a refresh year 302, which indicates the historic data set used to run the simulation or optimization. For example, the user may select a data set starting with the most recent data or a data set starting with data from an earlier year. A response curve option 303 allows a user to select response curves or functions that are based on an analysis of historical data, i.e., before future view, or to select an after future view, which are response curves that are adjusted, for example, based on the expertise of managers and other experts, of what will happen in the future. For example, the experts may adjust a response curve for revenue to account for an estimation that economic growth will improve in the next 12 months and consumer spending will increase.

Dimensions for the hierarchy are selected using available dimensions 304 and selected dimensions 305. In this example, the selected dimensions for the hierarchy are geography, product, and driver (i.e., marketing activity). The sequence for the dimensions is as shown.

Levels may also be selected for dimensions using selected dimensions 306, selected levels 307, and excluded levels 308. For example, in the selected dimensions 306, the user selects the driver dimension. The levels to include in the driver dimension are selected under the selected levels 307, such as driver category and driver totals, and the levels to exclude in the driver dimension are selected under the excluded levels 308.

After the levels are selected, the user may select filters to apply to the levels. For example, under geography, a list of states is provided. States to include and exclude in the view for the hierarchy are selected.

Also, a reference hierarchy may be selected. For example, a previous hierarchy may be stored. The user may compare variable values for a previous hierarchy with a new hierarchy. The previous hierarchy is the reference hierarchy or the reference scenario. Constraints may be based on variables for the reference hierarchy, as is described below.

FIG. 4A illustrates an example of a screen 400 that shows a view of a hierarchy, such as the hierarchy selected through the screen 300 of FIG. 3. Through the screen 400, the user can view the hierarchy and change values for different variables for simulation.

Starting at the top left of the screen, an optimization criteria 401 is selected. In this example, 401 is volume, but other examples may include revenue, profit, etc. The simulator 103 runs an optimization that estimates the optimum total investment to maximize sales volume. The output of the optimization may include a response curve, such as the curve 420 described in further detail below with respect to FIG. 4B.

The screen 400 also shows a name of the hierarchy, which is shown as scenario name 403. The name may have been provided through the screen 300. A constraint format 402 indicates the unit used to represent the constraint, which in this example is percentage of reference.

The screen 400 also includes the input variables, listed under investment 400, and the output variables, such as the volume 405. Other output variables may include revenue and profits.

The dimensions 406 are also shown. The dimensions include geography, products, and drivers. The geographies shown are Brazil and Japan. The products shown are products A-C, and a driver that is shown is TV, which falls under a particular driver category.

Each of the columns is now described. "Show Curve" allows a user to show a response curve for a selected dimension. In this example, response curves are selected for Brazil and Japan. The selected response are shown, such as described with respect to FIG. 4B. "Point Constraint" represents whether the constraints are applied or not. For example, if "Point Constraint" is selected, the constraints are not applied for optimization and simulation.

"Min Constraint" and "Max Constraint" are the constraints placed on the input variables, which in this example are the minimum and maximum percentage different from a reference. For example, the constraints indicate the marketing investment for Brazil cannot be reduced by more than 80% of the reference or increased by more than 120% from the reference (or from the input investment depending on whether the user has created a scenario with constraints that apply to investment). The input variables are the marketing investments for each dimension. When optimizing, if the constraints are applied, the marketing investments will not be varied outside the constraints when determining the optimal investments to maximize volume.

A "Min Exp Range" and a "Max Exp Range" indicate the high and low that the investment has ever been for the data set. "Reference" is the current investment amount for the data set, and "Scenario" is the amount that the current amount is changed. For example, the user may change an investment input for all of Brazil for simulation, and "Scenario" identifies the changed investment input, which is a changed input variable. "Inv Difference" and "% Inv Difference" show the amount of change for the input variable from the reference, which in this example is 0.

For the output variables, "Incremental" is the uplift, such as the volume generated above a base amount for each dollar spent. Base is the volume that be sold with no marketing. "Total" is the sum of the base and incremental. "Average ROI" and "Marginal ROI" are also shown.

In this example, the volume is shown as the output variable for the reference. Although not shown, the system 100 can also show the volume for the scenario, which is the estimated volume for the changed input variables put through the simulator 103. Also, other output variables may also be shown.

FIG. 4B shows examples of response curves generated for the hierarchy shown in FIG. 4A. For the response curves, the X axis is the marketing investment and the Y-axis is the incremental volume. Response curves may be generated for other output variables.

Response curve 420 is the result of running the optimization on the reference shown in FIG. 4A. The system 100 goes through every response curve to determine the optimal solution represented by the response curve 420. Response curve 420 shows that if the total investment for all the geographies is increased, the corresponding incremental volume is increased until the curve flattens out. For example, as the total investment approaches 600 million, the volume begins to flatten out, so there may be little benefit to increase the total investment over 600 million.

The optimization may be run so the constraints are satisfied. The response curve 421 is the result of the optimization if the constraints are satisfied. The point 422 shows the current investment total.

In the screen 400, response curves for Brazil and Japan were selected. The response curves 430 and 431 shown in FIG. 4B are for Brazil and Japan, respectively. The response curves 430 and 431 show the incremental uplift in volume for every dollar spent for the data set. The data set may be selected through the "Refresh Year" input shown in FIG. 3. The point 432 is the current total for Brazil, and the point 433 is the current total for Japan. Although not shown, points may also be shown representing min and max constraints and the experience range.

FIG. 5 illustrates an example of screen 500 that shows some of the input variables modified for simulation. For example, the input variable for the total marketing investment, shown as 501, is increased to 207.203 million from the reference amount of 115.113 million. As shown as 502, this represents an 80% increase from the baseline reference amount. Then, the simulation is run with the new marketing investment. The simulator 103 estimates the output variables based on the corresponding response curves. The estimated output variables are shown as 507-510, and these output variables can be compared to the output variables for the baseline, shown as 503-506. For example, as a result of increasing the marketing investment in Brazil, the incremental and total sales volume, shown as 507 and 508, is estimated to increase over the baseline volumes, shown as 503 and 504. However, the estimated average and marginal ROI, shown as 509 and 510, is estimated to decrease over the baseline average and marginal ROI, shown as 505 and 506.

4. Methods

Figure 6:
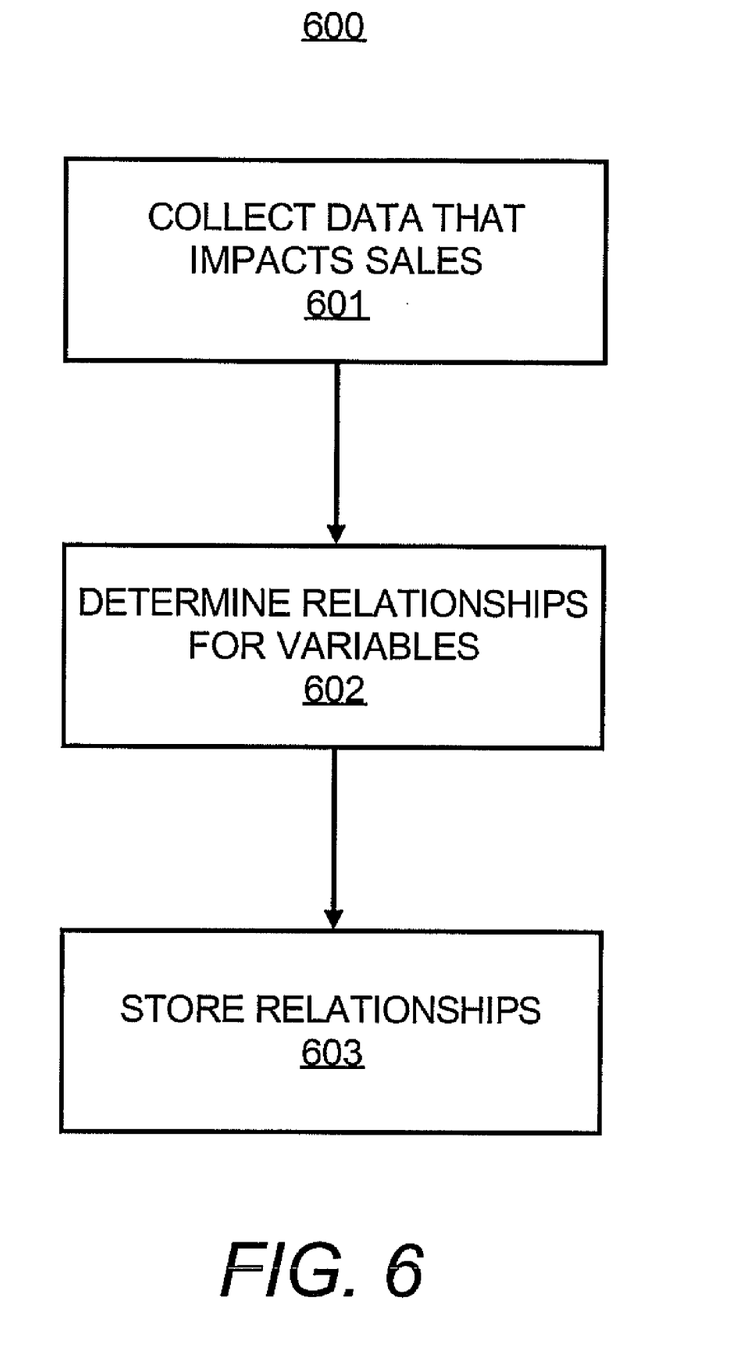
FIG. 6 illustrates a method for storing relationships between data for simulation, according to an embodiment.

FIG. 6 illustrates a method 600 for storing relationships between data for simulation, according to an embodiment. The methods 600-800 are described with respect to the system shown in FIG. 1 by way of example and not limitation, and the methods may be performed in other systems.

At step 601, all data that impacts sales is collected. This may include data for the variables in the dimensions. The variables include the input and output variables described above. The collected data may include marketing investments, volume, revenue, profit, etc., and factors that are independent of a company's efforts, such as whether the economy is in a recessionary state. Data may be collected for some or all levels of the hierarchies. For example, a dimension is geography, and levels of the dimension may include country, state, city, zip code, street, etc. Sales and marketing data is collected for each level. In another example, data is collected for the different products and driver categories shown in FIGS. 4A and 5. Outside agencies may be used in addition to internal divisions to collect the data. Data may be collected for only some of the levels, and the variable values for the non-collected levels are calculated from the collected data.

At step 602, relationships for the variables are determined. The relationship definer 104 may determine the relationships through regression analysis.

At step 603, the relationships are stored in a data storage device 102. The relationships may be stored as functions identifying how two or more variables are related. In addition to a function, each stored relationship identifies the variables that are related by the function and the dimension and level for each variable. For example, through regression analysis, a curve is generated that represents the relationship between the variable sales volume for a particular zip code and the marketing investment in dollars for TV marketing in that zip code. The curve is represented as a function and stored as a relationship for the variables sales volume and marketing investment for TV marketing in the zip code level of the geography dimension. A different relationship may be generated and stored for those variables in a different zip code. Similarly, relationships for other variables are determined and stored. The steps 601-603 are periodically repeated as new data is captured at step 601.

Figure 7:
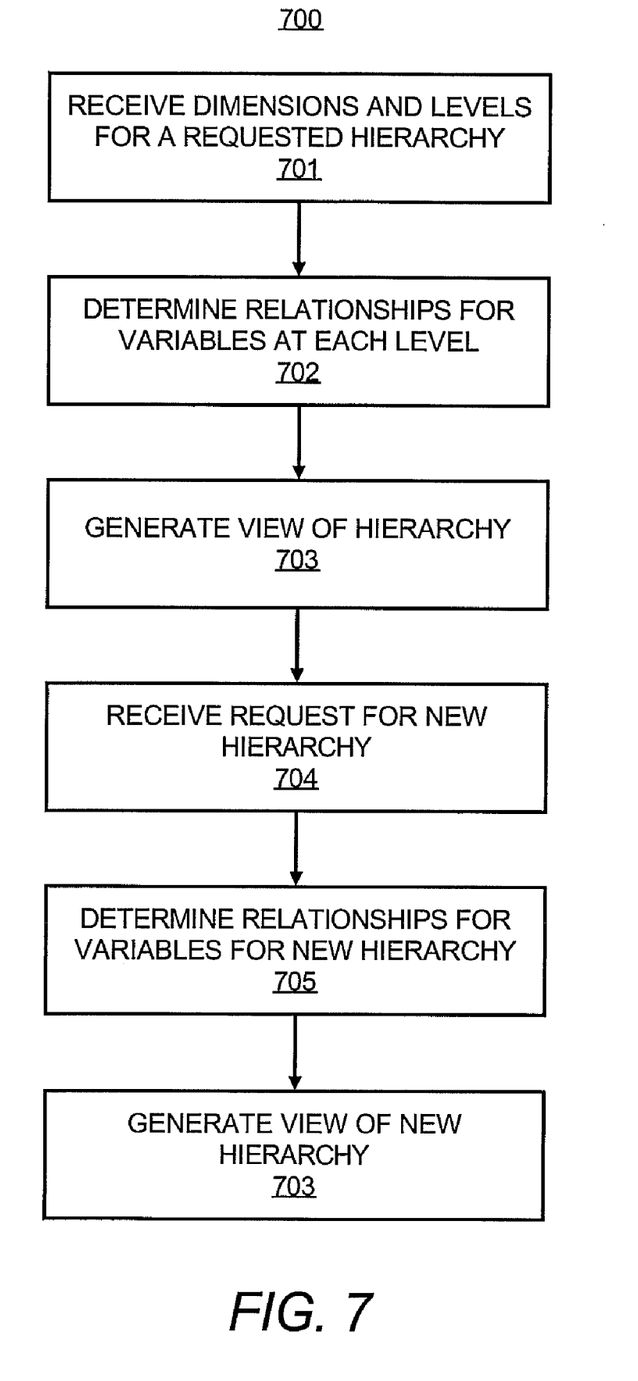
FIG. 7 illustrates a method for generating a view of a hierarchy, according to an embodiment.

FIG. 7 illustrates a method 700 for generating a view of a hierarchy, according to an embodiment. At step 701, dimensions and levels for a requested hierarchy are received at the system 100. For example, a user is presented options for selecting various dimensions through the MIO interface 101. The user selects dimensions and levels for a hierarchy. The sequence of the dimensions and levels for the hierarchy may also be selected by the user and received at the system 100. The user may also be able to select variables for each level or at least some of the variables are fixed for each level.

At step 702, relationships are determined for variables at each level. For example, the relationship definer 104 identifies all the relationships for the variables in the hierarchy to be viewed. The relationships are based on the selected hierarchy. Relationships may be stored for at least some of the variables in the levels for the requested hierarchy.

At step 703, a view of the hierarchy is generated using the relationships. For example, the view generator 105 calculates values for the variables based on their relationships. The values are displayed for each variable in the hierarchy, for example, through the MIO interface 101.

At step 704, a request for new hierarchy is received. The request includes the dimensions and levels and sequence of the dimensions and levels for the new hierarchy. The new hierarchy may include all the same dimensions and levels of the first requested hierarchy or at least some of the same dimensions and levels of the first requested hierarchy, but the sequence of the same dimensions and levels is different.

At step 705, relationships for the variables are determined. The change in sequence may result in different relationships being applied to determine the values for at least some of the variables even though the variables are the same as the first requested hierarchy. For example, the first requested hierarchy may include the country at a highest level of the hierarchy, and products in a lower dimension of the hierarchy. The relationships indicate that the marketing investments need to be aggregated for each product and for each state to determine the product marketing investment for the country for all products. The new hierarchy may include a product at the highest level, and thus the product marketing investment for the product is determined by aggregating across different states or countries for the product.

At step 706, a view of the new hierarchy is generated using the relationships. For example, the view generator 105 calculates values for the variables based on their relationships. The values are displayed for each variable in the new hierarchy, for example, through the MIO interface 101.

Figure 8:
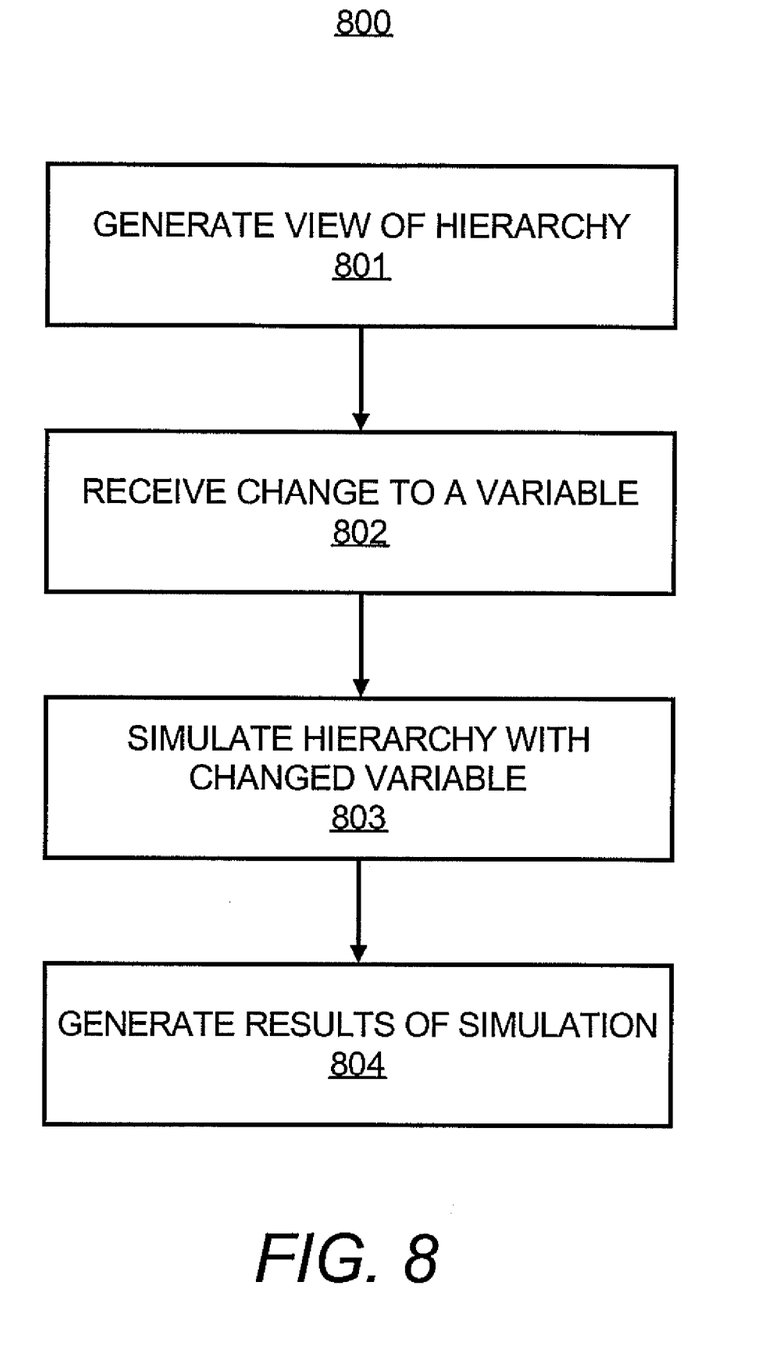
FIG. 8 illustrates a method for simulating different marketing conditions, according to an embodiment.

FIG. 8 illustrates a method 800 for simulating different marketing conditions, according to an embodiment. At step 801, a view of a hierarchy is generated. Step 801 may be performed by performing steps 701-703 of the method 700.

At step 802, a change to a variable is received. For example, variables are displayed in the view of the hierarchy. A user may change a value for a variable via the MIO interface 101. The values for input variables in the hierarchy may be changed by the user for simulation, as is described below. For example, a variable for a particular marketing investment is increased to determine how the change impacts the output variables. The input variables may include any variables that impact sales, such as amount spent for different marketing activities, independent economic factors, etc. The output variables may include information related to sales and ROI, such as incremental sales uplifts generated by marketing investments.

At step 803, the hierarchy is simulated with the changed variable. For example, the simulator 103 may communicate with the relationship definer 104 to determine relationships and models for the simulation based on the variables in the hierarchy. The models may include probability distributions of different output variables based on values for input variables. The regression analysis may include conventional techniques for modeling and analyzing several variables. The simulator 103 calculates the output variables, which may include an estimate of sales volumes, profits, or other ROI variables, etc., based on the changed input variables.

At step 804, the results of the simulation are generated. The results include estimations (e.g., expected returns) for output variables based on the models, relationships and input variables. For example, the simulator 103 runs the simulation and the results are a view of the hierarchy displayed via the MIO interface 103. The new view includes newly calculated values for any output variables that are affected by the changed variable. For example, the simulator 103 may estimate a new sales volume for a particular city if the modified variable includes increasing the marketing spend for that city.

The steps of the method 800 may be repeated to find the optimal marketing investment to achieve certain objectives. For example, different variables may be changed and then simulated and then based on the outcome of the simulation, the variables may be changed again or other variables may be changed until the simulation generates results that are in-line with an objective. For example, a manager may be allowed a 15% increase in marketing budget but needs to meet a target of 20% increase in profits for a product line. The manager uses the simulator 103 to simulate different increases to marketing activities that do not exceed the 15% constraint to identify spend increases for different marketing activities that will achieve 20% increase in profits for the product line.

6. Computer System for Executing Software

One or more of the steps and functions described herein and one or more of the components of the systems described herein may be implemented as computer code stored on a computer readable storage device, such as memory or another type of storage device. The computer code is executed on a computer system, for example, by a processor, application-specific integrated circuit (ASIC), or other type of circuit. The code may exist as software program(s) comprised of program instructions in source code, object code, executable code or other formats.

Figure 9:
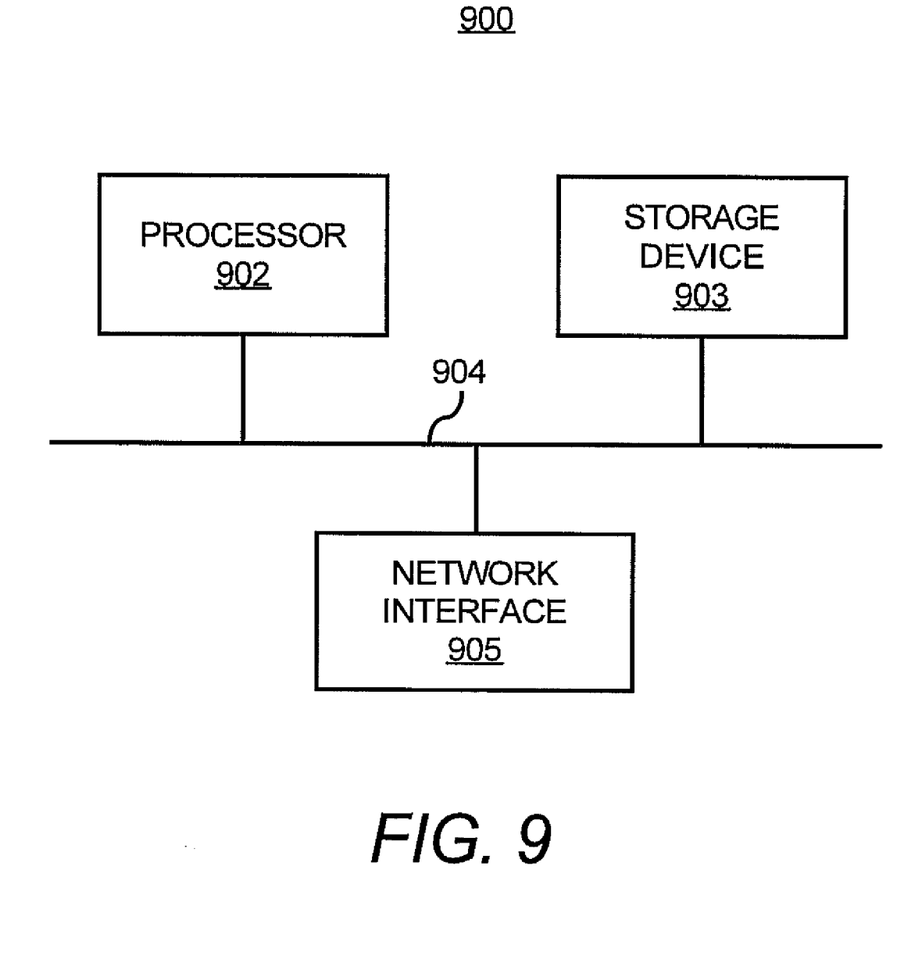
FIG. 9 illustrates a computer system configured to provide a hardware platform for the system shown in FIG. 1, according to an embodiment.

FIG. 9 shows a computer system 900 that may be used as a hardware platform for the system 100. The computer system 900 may be used as a platform for executing one or more of the steps, methods, and functions described herein that may be embodied as software stored on one or more computer readable storage devices, which are hardware storage devices.

The computer system 900 includes a processor 902 or processing circuitry that may implement or execute software instructions performing some or all of the methods, functions and other steps described herein. Commands and data from the processor 902 are communicated over a communication bus 904. The computer system 900 also includes a computer readable storage device 903, such as random access memory (RAM), where the software and data for processor 902 may reside during runtime. The storage device 903 may also include non-volatile data storage. The computer system 900 may include a network interface 905 for connecting to a network. It will be apparent to one of ordinary skill in the art that other known electronic components may be added or substituted in the computer system 900.

While the embodiments have been described with reference to examples, those skilled in the art will be able to make various modifications to the described embodiments without departing from the scope of the claimed embodiments. Furthermore, the system and methods described herein are generally described with respect to simulating and generating hierarchal views for marketing and sales data. However, the system and methods are applicable to simulating and generating hierarchal views for other types of data.

What is claimed is:

1. A method for generating a dynamic, investment-related, data hierarchy utilizing investment variables in a plurality of levels in the hierarchy and further utilizing one or more functions describing relationships between the variables in the plurality of levels, wherein the functions further describe the relationships if the hierarchy is modified to include the variables at different levels, the method comprising:

storing information related to sales, wherein the information includes dimensions and each of the dimensions includes at least one level and each of the levels is described by variables;

storing relationships between at least some of the variables;

receiving a request for a hierarchy, wherein the requested hierarchy includes a set of dimensions from the stored dimensions, at least one level for each dimension in the set, and a sequence of the dimensions or levels in the hierarchy;

calculating, by a computer system, values for the variables in the levels for the requested hierarchy using the stored relationships that are applicable to the variables in the levels;

determining whether there are multiple constraints for the different levels, and upon a determination that there are multiple constraints, determining whether there is a conflict between the multiple constraints; and upon a determination that there is a conflict between the multiple constraints:

determining ranges for the multiple constraints;

determining an overlapping range for the multiple constraints; and applying the overlapping range as a constraint; and generating a view of the hierarchy including the calculated values, wherein the view includes the dimensions or levels of the requested hierarchy in the sequence specified for the requested hierarchy.

2. The method of claim 1, further comprising:

receiving a modification to a value for a variable of the variables;

running a simulation using the modification and models associated with the variables; and estimating values for some of the variables based on the simulation.

3. The method of claim 1, further comprising:

receiving a change to the sequence of the dimensions and the levels of the hierarchy to generate a view of a new hierarchy;

identifying a new stored relationship from the stored relationships applicable for the new hierarchy, wherein the new stored relationship is different from the stored relationships used to calculate the hierarchy;

recalculating at least some of the variables in the levels using the new stored relationship; and generating a view of the new hierarchy using the recalculated variables.

4. The method of claim 1, wherein at least one of the relationships is a fixed ratio between two variables in the levels.

5. The method of claim 1, wherein at least one of the relationships is a function representing a curve defining the relationship between two variables in the levels.

6. The method of claim 1, wherein at least one of the relationships represents a halo effect, a cannibalization effect, or a synergy effect between two variables in the levels.

7. The method of claim 1, wherein at least one of the relationships describes the impact of corporate spending on a variable in the hierarchy at a level of the hierarchy spanning lower levels of hierarchies.

8. The method of claim 1, wherein at least one of the relationships describes a rule for determining a value for a variable in a lower level or a higher level based on an organization of the hierarchy.

9. A system to generate a dynamic, investment-related, data hierarchy utilizing investment variables in a plurality of levels in the hierarchy and further utilizing one or more functions describing relationships between the variables in the plurality of levels, wherein the functions further describe the relationships if the hierarchy is modified to include the variables at different levels, the system comprising:
  a data storage device to store information related to sales, wherein the information includes dimensions and each of the dimensions includes at least one level and each of the levels is described by variables, and the data storage device is to store relationships between at least some of the variables;
  a processor to:
    receive a request for a hierarchy, wherein the requested hierarchy includes a set of dimensions from the stored dimensions, at least one level for each dimension in the set, and a sequence of the dimensions or levels in the hierarchy; and
    calculate values for the variables in the levels for the requested hierarchy using the stored relationships that are applicable to the variables in the levels;
    determine whether there are multiple constraints for different levels of the hierarchy;
    upon a determination of multiple constraints for the different levels, determine whether there is a conflict between the multiple constraints; and
    upon a determination that there is a conflict, determine whether the conflict is resolvable, and resolve the conflict upon a determination that the conflict is resolvable; and
  a user interface to provide a view of the hierarchy including the calculated values, wherein the view includes the dimensions or levels of the requested hierarchy in the sequence specified for the requested hierarchy.

10. The system of claim 9, wherein the processor is to:
  receive a change to the sequence of the dimensions and the levels of the hierarchy to generate a view of a new hierarchy,
  identify a new stored relationship from the stored relationships applicable for the new hierarchy, wherein the new stored relationship is different from the stored relationships used to calculate the hierarchy, and
  recalculate at least some of the variables in the levels using the new stored relationship, and
  wherein the user interface is to provide a view of the new hierarchy using the recalculated variables.

11. The system of claim 9, wherein the processor is to:
  receive a modification to a value for a variable of the variables;
  run a simulation using the modification and models associated with the variables, and
  predict values for some of the variables based on the simulation.

12. The system of claim 11, wherein the user interface is to provide a view of the hierarchy including the predicted values.

13. A non-transitory computer readable storage medium storing computer code, the computer code, which when executed by a computer system, causes the computer system to:
  store information related to sales, wherein the information includes dimensions and each of the dimensions includes at least one level and each of the levels is described by variables;
  store relationships between at least some of the variables;
  receive a request for a hierarchy, wherein the requested hierarchy includes a set of dimensions from the stored dimensions, at least one level for each dimension in the set, and a sequence of the dimensions or levels in the hierarchy;
  calculate values for the variables in the levels for the requested hierarchy using the stored relationships that are applicable to the variables in the levels;
  determine whether there are multiple constraints for different levels of the hierarchy;
  upon a determination of multiple constraints for the different levels, determine whether there is a conflict between the constraints; and
  upon a determination that there is a conflict, determine whether the conflict is resolvable, and resolve the conflict upon a determination that the conflict is resolvable; and
  generate a view of the hierarchy including the calculated values, wherein the view includes the dimensions or levels of the requested hierarchy in the sequence specified for the requested hierarchy.

14. The non-transitory computer readable storage device of claim 13, wherein the computer code is to cause the computer system to:
  receive a modification to a value for a variable of the variables;
  run a simulation using the modification and models associated with the variables; and
  estimate values for some of the variables based on the simulation.

15. The non-transitory computer readable storage device of claim 13, wherein the computer code is to cause the computer system to:
  receive a change to the sequence of the dimensions and the levels of the hierarchy to generate a view of a new hierarchy;
  identify a new stored relationship from the stored relationships applicable for the new hierarchy, wherein the new stored relationship is different from the stored relationships used to calculate the hierarchy;
  recalculate at least some of the variables in the levels using the new stored relationship; and
  generate a view of the new hierarchy using the recalculated variables.

* * * * *